United States Patent [19]
Eouzan et al.

[11] Patent Number: 5,262,852

[45] Date of Patent: Nov. 16, 1993

[54] METHOD OF DETECTION FOR A PANORAMIC CAMERA, CAMERA FOR ITS IMPLEMENTATION, AND SURVEILLANCE SYSTEM EQUIPPED WITH SUCH A CAMERA

[75] Inventors: Jean-Yves Eouzan, Thorigne Fouillard/Cesson Sevigne; Jean-Claude Heurteaux, Liffre, both of France

[73] Assignee: Thomson-CSF, Puteaux, France

[21] Appl. No.: 844,660

[22] PCT Filed: Aug. 2, 1991

[86] PCT No.: PCT/FR91/00642

§ 371 Date: Apr. 3, 1992

§ 102(e) Date: Apr. 3, 1992

[87] PCT Pub. No.: WO92/03016

PCT Pub. Date: Feb. 20, 1992

[30] Foreign Application Priority Data

Aug. 3, 1990 [FR] France ............... 90 09967

[51] Int. Cl.⁵ .................. H04N 7/18; H04N 5/33; H04N 5/217; H04N 3/15
[52] U.S. Cl. ........................ 358/87; 358/108
[58] Field of Search ............ 358/87, 108, 109

[56] References Cited

U.S. PATENT DOCUMENTS

| | | | |
|---|---|---|---|
| 4,280,141 | 7/1981 | McCann et al. | 358/109 |
| 4,382,267 | 5/1983 | Angle | 358/23.19 |
| 4,488,305 | 12/1984 | Claverie et al. | 372/38 |
| 4,528,595 | 7/1985 | Eouzan | 358/213.22 |
| 4,562,471 | 12/1985 | Eouzan et al. | 358/172 |
| 4,613,898 | 9/1986 | Bagnall-Wild | 358/87 |
| 4,707,735 | 11/1987 | Busby | 358/87 |
| 4,740,681 | 4/1988 | Tsuno | 250/203.6 |
| 4,845,382 | 7/1989 | Eouzan et al. | 358/213.16 |

OTHER PUBLICATIONS

Patent Abstracts of Japan, vol. 13, No. 195, p. (E-754) (3543), May 10, 1989 & JP, A, 1016176 (NEC Co.) Jan. 19, 1989.

*Primary Examiner*—Howard W. Britton
*Attorney, Agent, or Firm*—Pollock, VandeSande & Priddy

[57] ABSTRACT

The invention relates to a method of photodetection for a panoramic camera and to a system for implementation of such a method. A panoramic camera can incorporate a photodetector system of the charge transfer type, an optical system for focusing on a sector of the field of observation and a mechanical rotational drive system for the support having a vertical axis of the assembly. The camera incorporates a photodetection system including at least one module constituted by contiguous arrays ($b_1$ to $b_n$) arranged vertically, structure permitting the integration of the charges in synchronism with the rotation of the support, structure for varying the number of activated arrays and for comparing the luminance levels received successively by the elementary cells of the various arrays situated at the same height. The invention also applies to target seeking and to the rapid detection of false alarms due to noise peaks.

6 Claims, 3 Drawing Sheets

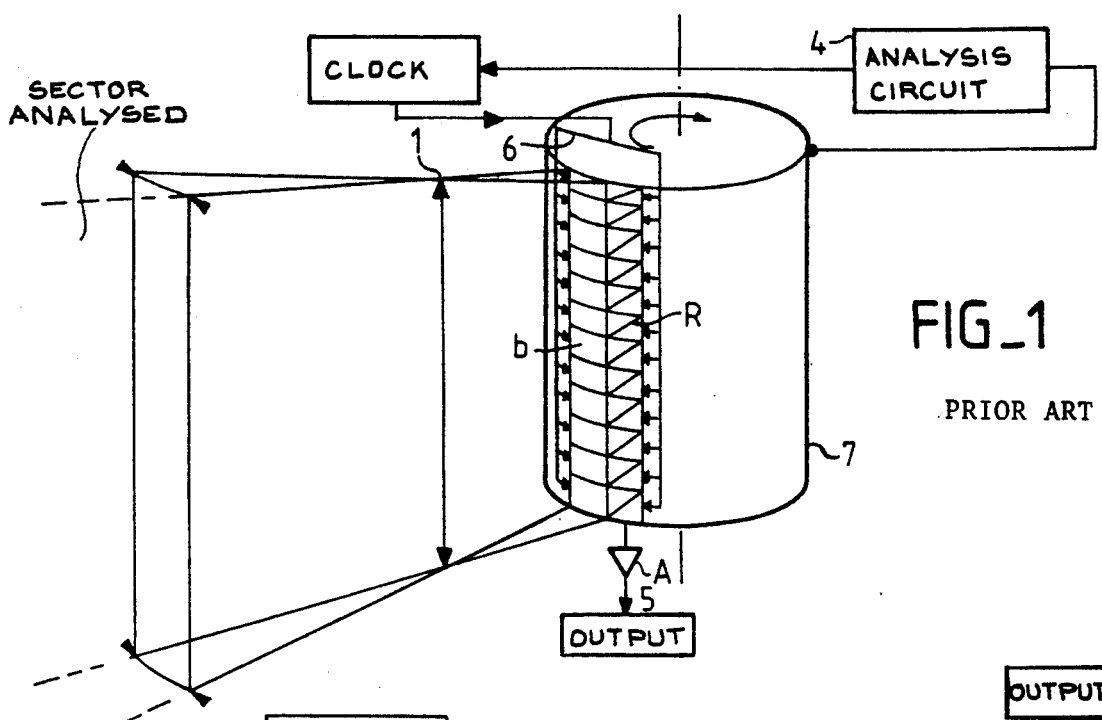
FIG_1
PRIOR ART
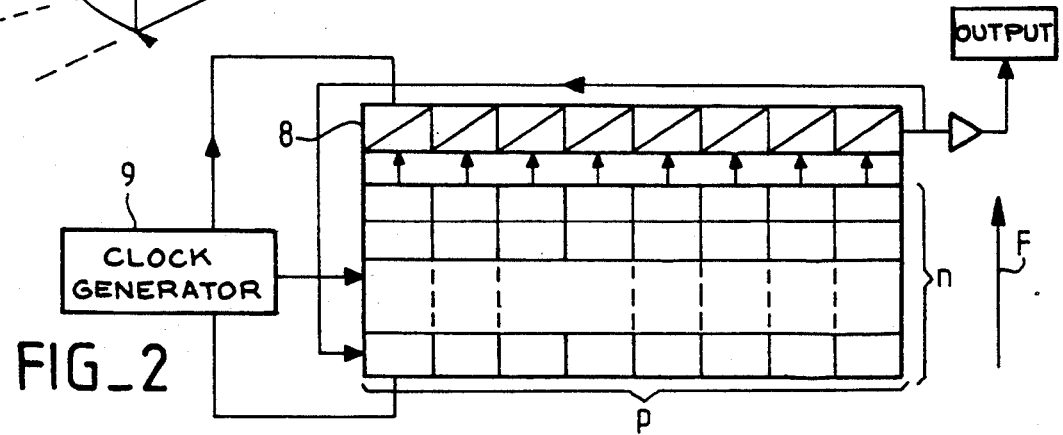
FIG_2
PRIOR ART
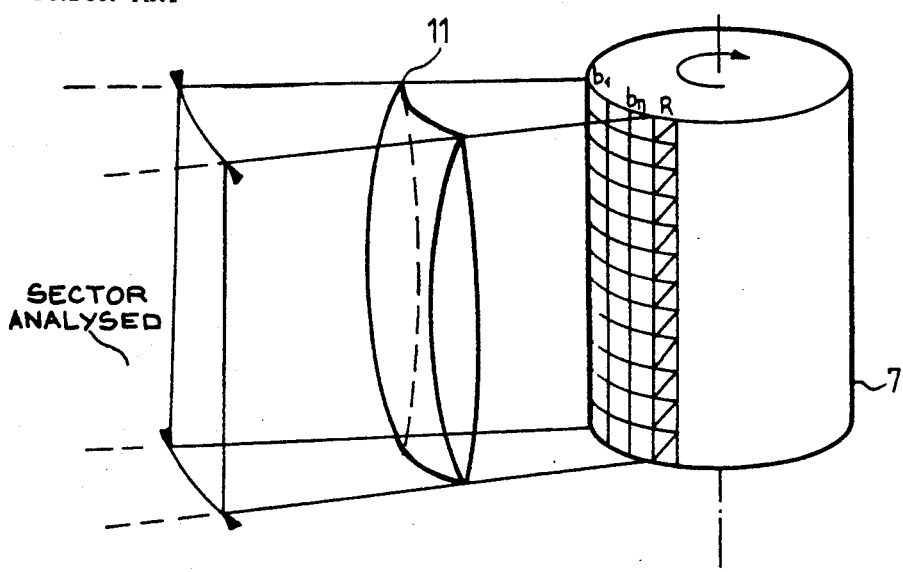
FIG_3

FIG_4
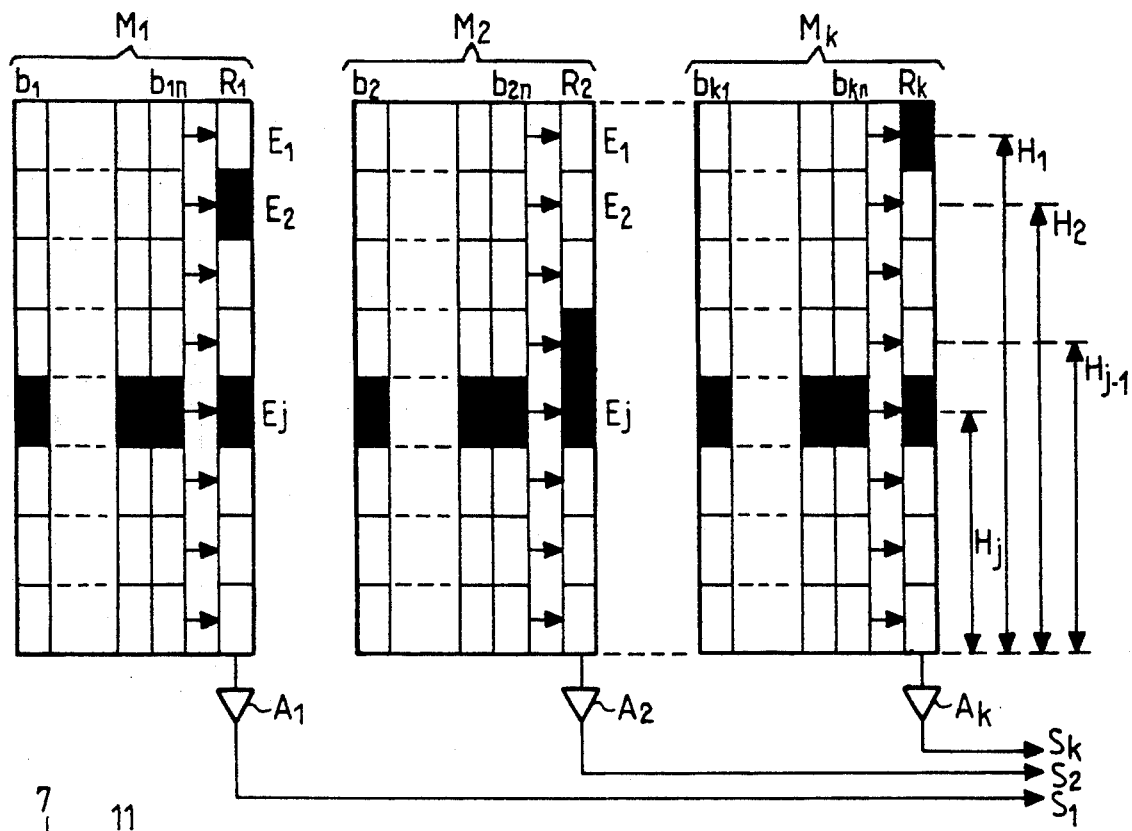
FIG_5
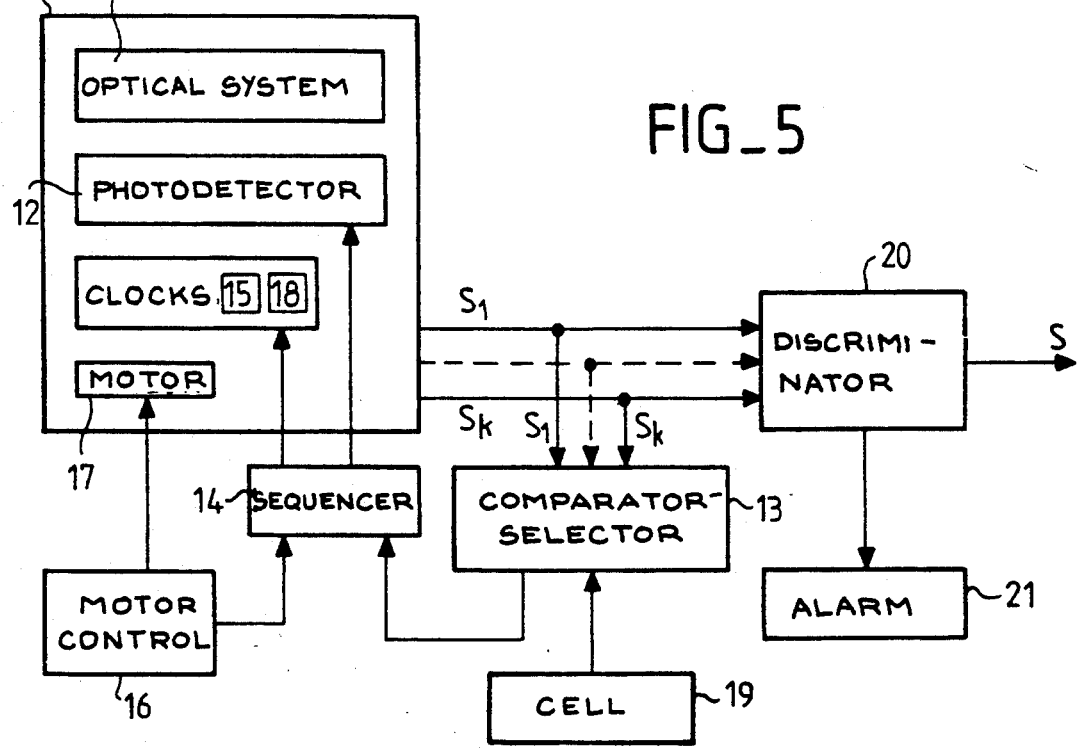

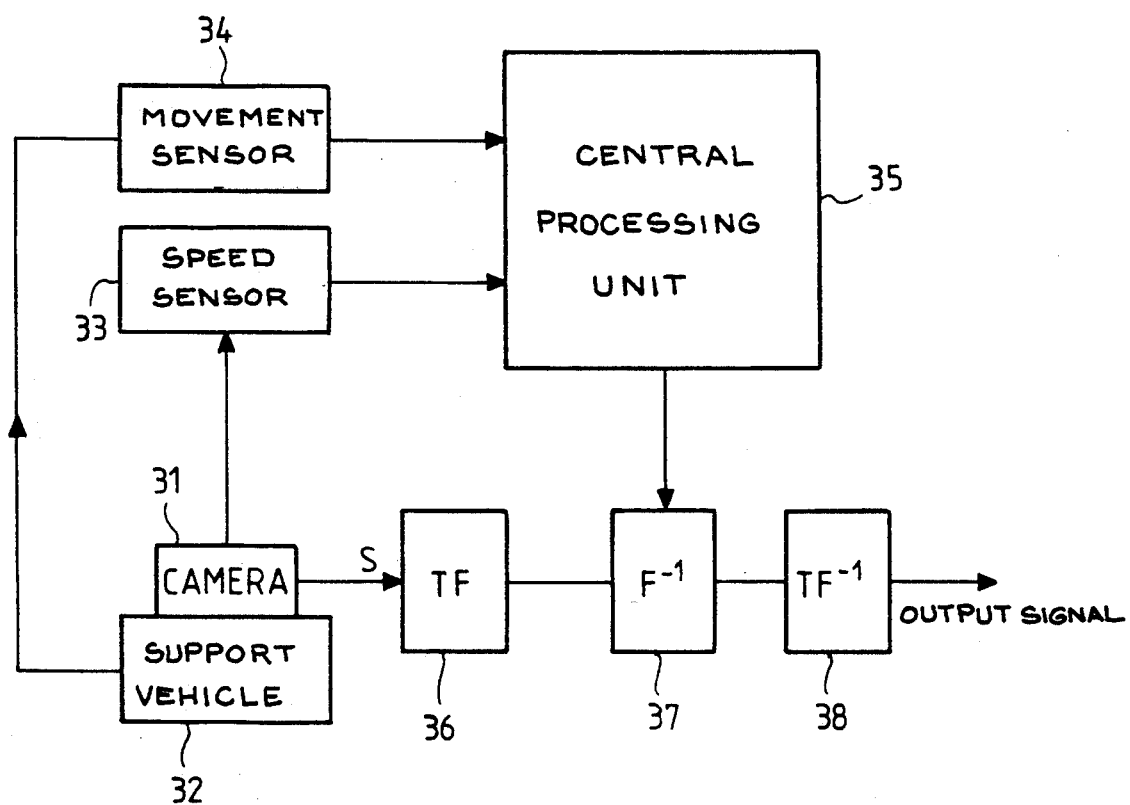
FIG_6

METHOD OF DETECTION FOR A PANORAMIC CAMERA, CAMERA FOR ITS IMPLEMENTATION, AND SURVEILLANCE SYSTEM EQUIPPED WITH SUCH A CAMERA

The present invention relates to the domain of the permanent surveillance of a field of observation of 360° or of a sector with the aid of a panoramic camera and, more precisely, it relates to a method of detection, a camera for its implementation, and a panoramic surveillance system equipped with such a camera operating in visible light or in infrared.

A panoramic camera usually delivers a signal on the basis of information supplied by integration of charges during continuous scanning of the field of observation over a sector of up to 360°; the image frequency, which can be defined by the analysis time of this sector by integration of charges, differs from that of a video type signal (for example, integration time of the charges: 540 $\mu$s and conventional video frame period: 64 $\mu$s). Such a camera, represented diagrammatically in FIG. 1, is composed mainly:

of an optical system, symbolized by a lens 1 for focusing a portion of the space analyzed onto a photodetector module;

of a photodetector module, constituted by a linear array b of p photodetector cells associated respectively with p stages, $E_1$ to $E_p$, of a read shift register R delivering a signal at the level of an output 5 through an amplifier A;

by a transfer clock circuit 6 delivering the necessary clock pulses to the array b and associated with an analysis circuit 4 of the speed of rotation of the array so as to transfer the charges synchronization with the rotation of the array b;

of a mechanical drive device (not shown) producing a movement in rotation of a support having a vertical axis, for example a tower 7, on which the optical system/photodetector assembly is installed.

The operation of such a camera is conditioned by the values of duration parameters. The duration separating two successive analyses of the same part of a space is given by the period of rotation $T_r$. It has to be short, of the order of a second, in order to permit rapid detection of objects appearing in this space. In the course of one complete rotation, the photodetector array b is periodically taken into integration of charges during an integration time $T_i$. In the course of this period, the quantity of charges integrated in the silicon substrate facing each cell is proportional to the quantity of photons received. At the end of each integration cycle, the integrated charges are transferred into a read register R. The synchronization clock circuit supplies charge transfer control signals from stage to stage up to the output 5. The electrical signal thus obtained at the output 5 is representative of the variations in luminance from top to bottom of the angular sector of the field of observation analyzed. The width of the sector analyzed depends on the number of readings per complete rotation, and thus ultimately on $T_i$.

The assessment of the performance characteristics of a panoramic camera results from the assessment of various criteria, in particular:

its time resolution, that is to say its response time;
its spatial resolution, measured by the precision of the location corresponding to a given variation in luminance;
its sensitivity resulting from its detection threshold.

More precisely, the performance characteristics of this type of camera are linked to the values of $T_i$ and to the $T_i/T_r$ ratio:

for short $T_i$: the time resolution, due to the reduction of response time, is good but the sensitivity diminishes since fewer charges have been able to be integrated;

the spatial resolution varies as a function of the $T_i/T_r$ ratio.

Optimization of this system leads to shortening the time $T_i$ while increasing the sensitivity to the maximum with the aid of a high electronic gain. But these conditions of use bring about a poor signal/noise ratio, that is to say poor discrimination between target detection and detection of a temporary noise peak due to the high gain, this poor discrimination being able to lead to a false alarm. In order to remove the uncertainty, it is necessary to wait for the next pass or passes of the detection system in the same direction (i.e. one or several times $T_r$), which can be extremely detrimental to rapid targets taking account of the speed of rotation of the tower.

Moreover, the mounting of a panoramic camera on a mobile craft (terrestrial, aerial or marine) entails faults in the image due to the movements of the vehicle, these faults being capable of being amplified by errors in the speed of rotation of the axis of the camera.

The object of the invention is to overcome these drawbacks by proposing a method of detection and a camera for its implementation intended to:

achieve good time and special resolution by virtue of a short integration time $T_i$;

provide good sensitivity of the detection system and regulation adapted to this sensitivity in the conditions of use;

permit removal of doubt about alarms without waiting for the expiration of a rotation period $T_r$.

improve the image quality by removing degradations due to the-movements of the carrier of the camera.

In order to achieve these objectives, the method of photodetection for a panoramic camera incorporating a photodetector system made up of n rows of p photosensitive cells and a read shift register, a support having a vertical axis for this photodetector system constituted by a cylindrical tower,, an optical focusing system for focusing the image of one sector of the field of observation onto a strip extending from top to bottom of the tower over a width of a row of cells, a mechanical rotational drive system for the optical system/photodetector system assembly, is characterized in that the charges from each pixel of the row coinciding with the said strip are integrated, and in that the charges from one row are transferred to the adjacent row which comes into coincidence with the same image strip, and so on until the nth row, synchronized with the speed of rotation of the tower. Thus, when the charges accumulate opposite the same analyzed sector of observation, the apparent duration of the integration time of the charges is multiplied by a factor n without increasing the real value of this integration time.

Other characteristics and advantages of the invention will appear on reading the description which follows given with reference to the attached figures which respectively represent:

FIG. 1 (already mentioned), a diagram illustrating the photodetector system of the prior art;

FIG. 2, the principle of the accumulated transfer of integrated charges;

FIGS. 3 and 4, two embodiments of the photodetector system of the camera according to the invention;

FIG. 5, the organization of the assembly of the circuits and the elements of the camera according to the invention;

FIG. 6, a block diagram showing a panoramic surveillance system equipped with a camera according to the invention.

The present invention is based on a known specific mode of integration of charges called TDI mode (for "Time Delay and Integration" meaning: integration in non-real time). The TDI mode ensures an accumulated transfer of charges and is applied in plane imagers. Such a mechanism of the accumulated transfer is illustrated in FIG. 2: a plane imager in TDI mode is constituted by the juxtaposition of n linear photosensitive arrays arranged in a line and constituted by P elementary cells each defining a pixel; the integrated charges in each of the pixels of a given line, with an integration time of 19 or 20 ms, are transferred in synchronism into each of the pixels of the adjacent line situated opposite, and so on up to the horizontal read shift register 8, the register being read every 64 µs. The quality of the image depends very substantially on the synchronism between the transfers of charges, managed by a clock circuit generator 9, and the progress of the imager, whose direction is indicated by the arrow F, with respect to the scene analyzed: the speed of progress of the optical image in the plane of the imager must thus be perfectly stabilized in order that the electronic image follows the developments in this optical image synchronously.

The structure of the plane imager, which has just been briefly described, is incompatible with use in panoramic mode, for three main reasons:
- there is no plane imager sensitive to infrared, whereas a panoramic camera must necessarily be able to work in visible mode or infrared;
- the structure of the plane imager imposes a vertical progression of the image of the scene observed. However, in a panoramic camera, the photodetector system turns horizontally and is consequently borne by a tower having a vertical axis of rotation;
- the timing of the plane imager, in particular a charge integration time which is much too long (at least 200 times), is totally unsuitable for use in panoramic cameras;
- in a plane imager the progress of the image to be analyzed must be perfectly synchronized with the transfer of the charges, which is feasible when the framing of the scene of observation is fixed. Now, in a panoramic camera, it is a question of observing a space in rotation while on board moving equipment: the movements of the vehicle, by compounding the errors in speed of rotation of the axis of the camera, would lead to significant faults of instability or of blurring of the image, and the synchronism between the progress of the image and the transfer of the charges would no longer be ensured.

In contrast, the method according to the invention permits integration of the principle of the accumulated transfer of charges in a panoramic camera. It consists:
- in a first stage, in successively accumulating n times the charges of the photodetector of the panoramic camera, during an apparent integration time equal to n times the integration time of the charges $T_i$.

The introduction of this integration time, equal to n times $T_i$, is described as apparent because it permits the sensitivity of the system to be increased, by multiplying it by a factor n, without increasing the real integration time $T_i$ and thus without reducing the time and spatial resolutions of the camera;
- in a second stage, in varying the value of this factor n so as to be able to adjust the sensitivity of the camera at will as a function of the defined image quality desired, for example, on the basis of a measurement of the mean illumination of the scene observed, or of a measurement of the image contrast established on the basis of the measurement of the variation in the luminance level of the output signal.

The method according to the invention can be complemented by a third stage which consists in comparing the values of the luminance levels successively received by the photodetector system, the values being compared at each point of the observed space for a focusing of the same height, and in triggering an alarm when a correlation between these various values appears.

In order to implement this method, a first embodiment of a panoramic camera is represented in FIG. 3. It incorporates a surface sensor of the DTC type (charge transfer device type) made up of n columns of p photodetector cells $b_1, \ldots, b_n$, arranged vertically in a column on a tower 7 having a vertical axis, and a read register R, also vertical.

In accordance with the invention, the surface sensor DTC chosen for working in a panoramic mode has to have a timing such as to make it able to work in TDI mode, that is to say the timing described above for the plane imager operating in TDI mode; now, in order to operate thus, that is to say by integration by line or by column, the surface sensor must meet two conditions:
- possess a photosensitive area capable of containing all the data from the same image;
- operate in charge transfer in this zone.

These conditions are fulfilled with a sensor of the interline type or with a sensor of the frame transfer type. In both cases the accumulation of the charges produced in TDI mode is done column by column by transfer in the memory areas and the reading is done by vertical shifting of the charges accumulated into the read register. The observation sector analyzed is projected onto an area successively covering each of the columns $b_1$ to $b_n$ of photosensitive cells by the use of an optical focusing system 11 fixed to the tower 7 and constituted, for example, by a cylindrical lens. The charges integrated in the silicon substrate, opposite each pixel of a given column $b_i$, are transferred simultaneously into the silicon substrate situated opposite each pixel of the same row of the adjacent column $b_{i+1}$.

The speed of rotation of the tower 7 is such that the transfer of charges from one column to the other is carried out in synchronism with the progress of the columns in the opposite direction, so that the integrated charges accumulate on the area of focus of the same observed sector. More precisely:
- in the case of an interline type sensor, the clock generator has to ensure double synchronism: the transfer of the integrated charges to the blind memory registers and the addition of the data by transfer of charges from register to register up to the read register in synchronism with the movement of the image projected onto the sensor;
- in the case of a frame transfer type sensor, the photosensitive areas and the storage areas of the integrated charges are coincident; the clock generator of such a sensor must manage a single synchronism: that of the accumulated transfer of charges to the read register with the movement of the projected image.

The integration time of the charges $T_i$ is at the most equal to the time separating the passing of two columns over the same area of focusing of a given observed sector; the speed of rotation of the camera and the image resolution which it is finally desired to obtain govern the charge transfer timing to be applied. For example, an integration time of 100 μs is compatible with a DTC sensor (of $512 \times 512$ or $1024 \times 1024$) pixels of one of the two types chosen, the transfer time to the memory registers being of the order of a few microseconds for the interline sensor and less than a microsecond for the frame-transfer sensor.

The sensitivity of the system is multiplied by a factor n by going from a photodetector made up of a single array of cells to a surface sensor made up of n columns of cells, the noise introduced by the transfer of charges from one array to the other being negligible with respect to the noise resulting from the transfer of charges into the read shift register.

This first embodiment, implemented on the basis of a DTC sensor with adapted timing, has the main aim of increasing the sensitivity of the detection system. However, such a matrix sensor does not permit this sensitivity to be regulated, and only masking of a part of the matrix allows a mechanical solution to such a regulation. In order to get past this stage a second embodiment of a panoramic camera according to the invention incorporates a sensor which is more specifically suited to the "panoramic in TDI mode" exploration on which the invention is based. The structural organization of this sensor permits, in addition to the increase in sensitivity:

regulation of the sensitivity of the camera rapid removal of doubt about alarms.

In order to remove the uncertainty between the detection of a real object and a noise peak, without waiting for a complete rotation of the camera, the foregoing surface sensor, made up of n columns of p photosensitive cells, is reproduced k times in a second embodiment. Each sensor plays, in these conditions, the role of a photodetector module, the set of these modules thus forming the photodetector system. FIG. 4 illustrates such a system shown flat and made up of k photodetector modules, distributed over the periphery of the tower 7. The panoramic camera which includes such a system thus incorporates an optical focusing system of the field of observation on the tower so that it successively focuses, and in the same way, a given sector of observation onto each array which comes to be superimposed on the image area of this sector. The optical system is constituted, for example, by the cylindrical lens of FIG. 3 but, this time, rotating around the axis of rotation of the tower. Each of the modules $M_1$ to $M_k$ is composed of n columns of P photosensitive cells, respectively $B_{11} \ldots b_{1n}, b_{21} \ldots b_{2n}, \ldots, b_{k1} \ldots b_{kn}$, and of an associated read shift register $R_1$ to $R_k$ respectively. The outputs of these registers are linked to amplifiers, respectively $A_1, \ldots, A_k$.

Each output $S_1$ to $S_k$ of each amplifier delivers a voltage whose level variation reflects the variation in luminance between a line of a photodetector module and the following line of this same module. In effect, the quantity of charges represents, for the associated line j, the level of luminance accumulated in an elementary area of the field analyzed whose image is situated at a height $H_j$; this height $H_j$ corresponds to the position of the line j in the photodetector module and of the stage $E_j$ of the associated register. Thus, a real object which gives rise to a modification in the level of the signal at the output $S_1$ corresponding to the luminance level of the jth line, gives rise to a substantially identical modification in the output $S_2$ corresponding to the jth line of the second module with a known delay depending on the speed of movement of the image, and so on, up to the output $S_k$. If the same modification in the luminance levels is produced for the same line height of the various photodetector modules after compensation for the delays between the outputs $S_1$ to $S_k$, there is a correlation between the various signals. On the contrary, a detected noise peak, which appears on some or all of the outputs $S_1$ to $S_k$, is indexed at various heights for example $H_1$, $H_2$, $H_{j-1}$ on FIG. 4, and thus at various stages for each register associated with each photodetector module. There is then a lack of correlation between the signals and thus a false alarm: doubt is thus removed by the compared reading of the output signals stage by stage.

The organization of the assembly of circuits and members making up the camera according to the invention is illustrated in FIG. 5. The optical system 11 successively forms the image of a portion of given space on each of the k modules of the photodetector system 12 arranged on a tower 7. A comparator-selector 13 processes the signals originating from the outputs $S_1$ to $S_k$ supplied by the k outputs after amplification; the comparator-selector 13 measures the image contrast by comparison between the deviations in levels of a known signal; the comparator-selector 13 then delivers a control signal to a sequencer circuit 14 for the selection of the number of columns, from 1 to n, contributing to the integration of charges by comparison of the contrast thus measured with a predetermined reference value. The sequencer 14 thus ensures the synchronization between:

a clock 15 for the transfer of charges column by column in synchronism with the speed of rotation of the camera, imposed by the control 16 of the drive motor 17, a clock 18 for reading read shift registers, and the control signal for selection of the number of columns applied to the photodetector 12 and originating from the comparator 13 on the basis of the measurement of the image contrast and/or of the level of illumination of the photodetector system measured by a cell 19. The sequencer 14 applies control signals to the clocks 15, 18 of the photodetector system in order to synchronize the transfer of charges, for a number of arrays which is predetermined by the comparator 13 and the rotational drive speed of the system.

A discriminator 20 also receives the signals originating from the outputs. $S_1$ to $S_{2k}$ of the read registers in order to memorize them and compare their values, stage by stage, that is to say f or the lines of cells of the photodetector modules situated at the same height. The discriminator 20 can trigger an alarm 21.

In operation, the panoramic camera according to the invention possesses:

an adapted sensitivity, established with regard to its level of illumination determined by the cell 19 and/or of the contrast determined on the basis of the variation in the level of output signals measured by the comparator-selector 13. This sensitivity is a function of the number of arrays participating in each photodetector module for the integration of the charges, this number varying between 1 and n. This number is such that a predetermined threshold of illumination or of contrast is observed or attained, the comparison between the values of illumination or of contrast being carried out in the region of the comparator-selector 13.

an extremely dynamic target recognition ability: the distinction between detection of a target and of a noise peak is obtained on the basis of the comparison between the levels of signals $S_1$ to $S_k$ for the same stage of the read registers, that is to say for the same height of lines of cells of each of the photodetector modules. These levels memorized in the discriminator 20 are compared for the same line height and, when a correlation of values appears for levels corresponding to the same line height, the alarm 21 is triggered by virtue of a control signal originating from the discriminator 20 without it being necessary to wait for a complete rotation of the rotation system.

The panoramic camera, which has just been described, can advantageously be combined, in a panoramic surveillance system, with a system for processing the signal coming from the camera intended to compensate for faults in photography due to errors in the speed of rotation of the camera and to the movements of the support vehicle itself. FIG. 6 is a block diagram illustrating such a surveillance system. It comprises a panoramic camera 31, such as that shown in FIG. 5, and measurement sensors 33 and 34 respectively measuring the speed of rotation of the camera and the movements of the support vehicle 32 with respect to a reference system. A central processing unit 35 groups together the data originating from the sensors 33 and 34, and calculates the correction signals to be applied to the signal delivered by the camera 31 in the following way: the unit 35 calculates the coefficients of a space/time filtering F having the same effects as the errors in the speed of rotation of the camera and those which are a consequence of the movements of the support vehicle 32, then the coefficients of the inverse space/time filter $F^{-1}$; in order to apply the correction signals, a Fourier transform TF is carried out on the signal delivered by the camera 31 in a processing stage 36, in order to pass from the time domain to the frequency domain; a processing stage 37 then produces the inverse filtering $F^{-1}$ on the basis of the coefficients delivered by the unit 35 on the output signal from stage 36; a processing stage 38 finally permits passage back to time mode, by application of the inverse Fourier transform $TF^{-1}$, so as to deliver a final corrected signal.

We claim:

1. A panoramic camera comprising:
   a cylindrical support tower;
   at least one array of photosensitive cells mounted to the tower, including a preselected number of rows and n columns of cells, the sensitivity of the camera being a function of n;
   at least one shift register mounted to the tower, adjacent a last column of cells of the array, and having a number of stages equal to the number of rows;
   means for focusing the image of one sector of a field of view onto the area of a column of cells;
   means for rotating the tower about its axis;
   means for synchronizing the rotation of the tower with the transfer of integrated electrical charge from a cell in a particular row to a corresponding cell in the same row, in an adjacent column, until the charge is stored in a corresponding stage of the shift register;
   luminance discrimination means for comparing the output from the shift register at successive moments in time; and
   means connected to an output of the discrimination means for signaling an alarm comparison condition signifying the detection of a noise signal.

2. The camera set forth in claim 1 wherein each array and associated shift register form a photodetector module, the camera including a preselected number of identical modules mounted to the support tower; and
   clock means for enabling read out of the shift register, associated with each module, to the discrimination means.

3. The camera set forth in claim 2 together with:
   comparator-selector means for measuring level deviations of the outputs from the shift register thereby ascertaining image contrast, the comparator-selector means generating, by comparison with a predetermined threshold, a control signal variably enabling a number of columns in each array of each module, thereby achieving a desired contrast; and
   sequencing means for synchronizing operation of the clock means and the comparator-selector means.

4. The camera set forth in claim 2 together with:
   a reference photosensitive cell mounted to the tower;
   comparator-selector means for measuring level deviations of the outputs from the shift registers thereby ascertaining image contrast, the comparator-selector means generating, by comparison with a reference cell output, a control signal variably enabling a number of columns in each array of each module, thereby achieving a desired contrast; and
   sequencing means for synchronizing operation of the clock means and the comparator-selector means.

5. The camera set forth in claim 2 wherein the luminance discrimination means stores outputs from each shift register and performs corresponding stage by stage comparisons to establish identity of the bits in respective stages of the shift registers.

6. A mobile panoramic camera comprising:
   a vehicle;
   a cylindrical support tower mounted to the vehicle;
   a plurality of arrays of photosensitive cells mounted to the tower, each array including a preselected number of rows and n columns of cells, the sensitivity of the camera being a function of n;
   a plurality of similar shift register mounted to the tower, each shift register located adjacent a last column of cells of a corresponding array, and having a number of stages equal to the number of rows;
   means for focusing the image of one sector of a field of view onto the area of a column of cells;
   means for rotating the tower about its axis;
   means for synchronizing the rotation of the support tower with the transfer of integrated electrical charge from a cell in a particular row to a corresponding cell in the same row, in an adjacent column, until the charge is received and stored in a corresponding stage of the shift register;
   luminance discrimination means for storing outputs from the shift registers and performing corresponding stage by stage comparisons to establish identity of the bits in respective stages of the shift registers;
   a sensor for sensing vehicle movement;
   a sensor for sensing camera tower rotational speed;

means for processing data received from the sensors and generating corrective coefficients therefrom;

means for obtaining a Fourier transform of an output from the discriminator means;

first means for obtaining an inverse Fourier transform of the coefficients combined with the Fourier transform; and second means for obtaining an inverse Fourier transform of an output from the first inverse Fourier means and producing a corrected camera output signal.

* * * * *